Fig. 2.

July 14, 1953 W. B. HILDMANN 2,645,327
JOG FEEDER FOR BOOKS
Filed Jan. 16, 1948 7 Sheets-Sheet 5

Inventor.
William B. Hildmann
By
Attorney.

July 14, 1953  W. B. HILDMANN  2,645,327
JOG FEEDER FOR BOOKS

Filed Jan. 16, 1948  7 Sheets-Sheet 7

Inventor.
William B. Hildman
By
Attorney.

Patented July 14, 1953

2,645,327

UNITED STATES PATENT OFFICE 2,645,327

JOG FEEDER FOR BOOKS

William B. Hildmann, Chicago, Ill., assignor to Brock & Rankin, Chicago, Ill., a corporation of Illinois Application January 16, 1948, Serial No. 2,571

23 Claims. (Cl. 198—29)

This invention pertains to bookbinding machinery and the like, and has for its principal object the provision of a jog-feeder for gathered pages, signatures, sections, and the like.

By jog-feeder is meant a device which feeds book signatures, for example, and in the process, jogs the sheets and pages thereof into alignment suitable for the next operation in binding.

Viewed from another aspect, it is an object of the invention to provide a jog-feeder for gathered pages, sheets, or signatures, and operating to transport each assembly or gathering from an infeed station into one or another type of binding machine for a subsequent operation, and in the process of transport as aforesaid, to square the sheets, pages, sections, or the like into proper alignment and trim to prepare and condition the gathering, book, or other pack of sheets for said subsequent operation.

One adaptation of the novel jog-feeder utilizes the same to feed gathered book signatures into a primary gluing machine which applies a first coat of glue to the binding edges of signatures to prepare the same for handling in the subsequent operation of rounding and backing.

Accordingly, it is a further object of the invention to provide a jog-feeder including an infeed mechanism receiving the signatures, and a combination jogging and conveying mechanism which squares and aligns the sheets as aforesaid and also transports the signatures into a primary gluing machine in synchronism with the operation of the latter.

Further objects include the provision, in a machine of the class characterized, of a novel infeed for signatures and the like, and which affords an initial jogging achieved by a unidirectional transport having a retractive component which is effective to achieve some preliminary trim in feeding the signatures to an advancing device, while also relieving pressure on the leading book signatures so that said advancing device can remove said leading book from the infeeding stack without disturbing the initially aligned sheets.

Still further objects include the provision of a simple jogging means coacting with conveying means for directing the books of sheets or signatures along a predetermined path, said coacting means both acting to effect a squaring or alignment of the sheets; together with intermittent drive mechanism and means for synchronizing the same with a companion machine receiving said books.

Additional objects and aspects of novelty and utility pertain to details of the construction and operation of the machine described hereinafter in view of the accompanying drawings, in which.

A brief introductory statement of operation will be found hereinafter.

Introductory statement of operation

Figure 2:
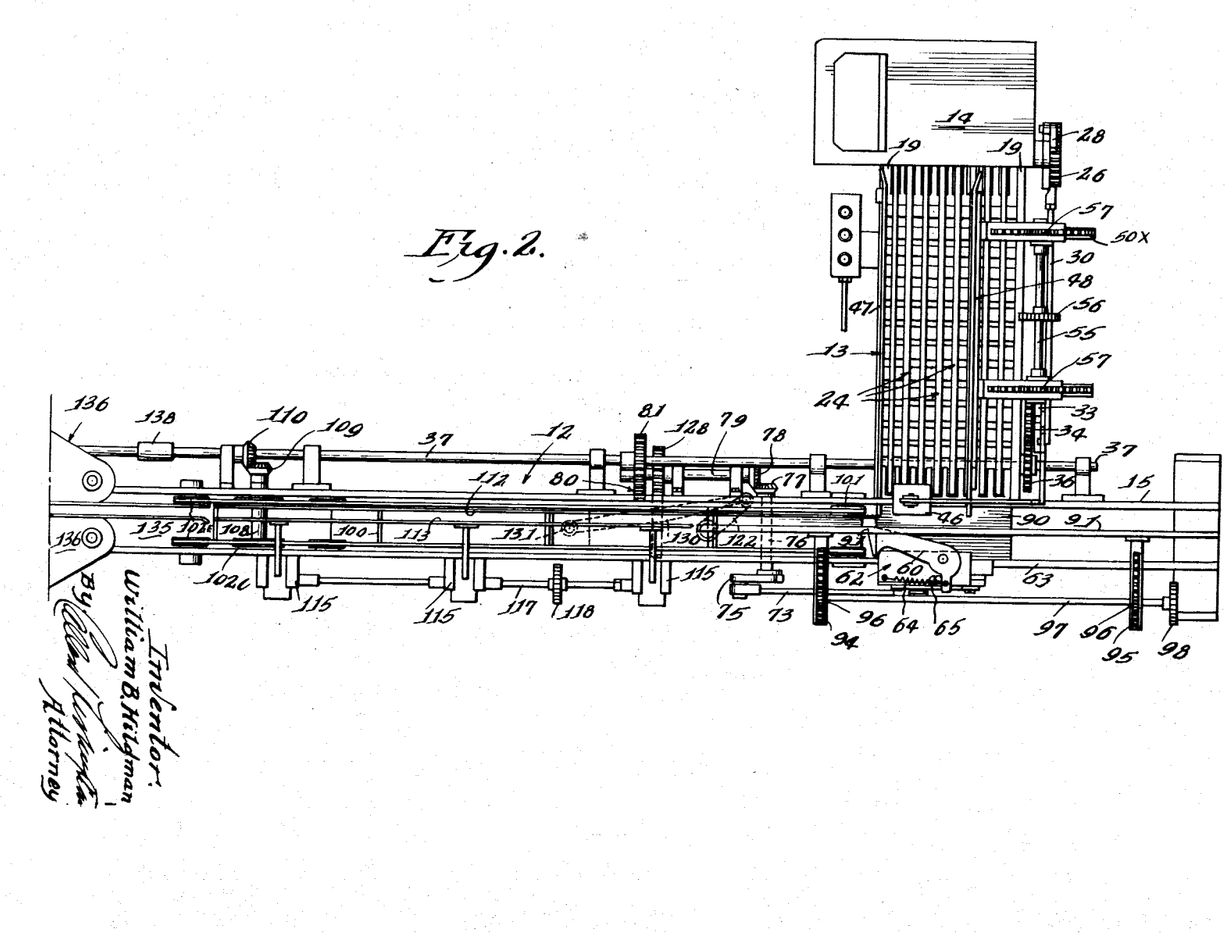
Fig. 2 is a top plan view of the same.
Figure 3:
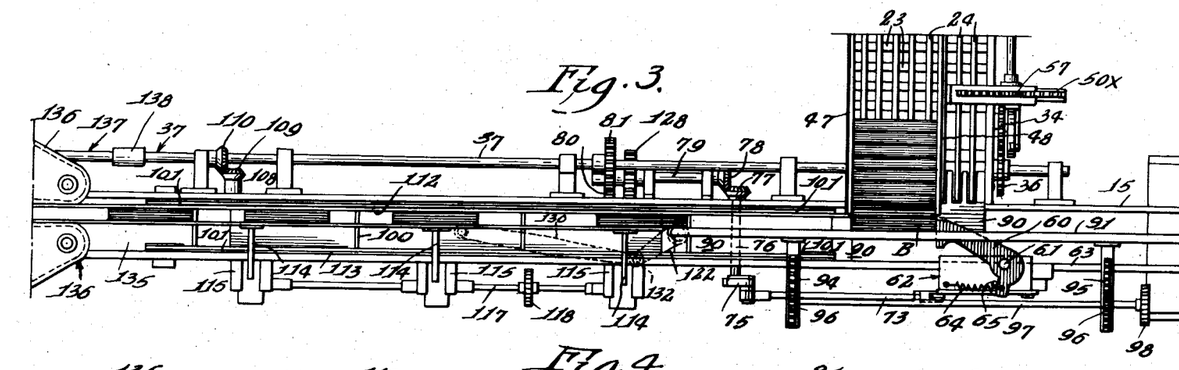
Fig. 3 is a fragmentary top plan view of the same with the book advancing means in starting position.

Referring to Fig. 2, the leaves or signatures, sewn loosely in book form and sheets cut to trim size, are fed from table 14 onto unidirectional feeding belts 24 and against stop rail means 91, as illustrated in Fig. 3.

A reciprocating advancing pawl 60 picks off the leading book and moves the same to a position where it can be engaged by bar 100 on a continuously travelling pair of chains 101 and pushed off apron 90A for a jogging drop down onto a rapidly reciprocating jogging bed plate 120 (Fig. 4), which alternately jumps each book ahead of its conveying chain bar 100 and returns the book sharply back against said bar to effect jogging action.

The jogged books are conveyed by bars 100 as aforesaid onto a discharge bed 135 to a point where they can be seized by infeeding belt means 136 of an associated machine, such for example as a gluing machine.

Preferably, the novel jogging machine is synchronized with the associated machine by taking its power for its main drive shaft 37 from the main drive shaft 136 of said associated machine; in this way, a smooth flow of books is possible from one machine into another without disturbing the trimmed-up or jogged books, the gluing machine, for example, applying glue to the binding edges of the books to maintain them in trimmed-up or squared up condition for future binding operations.

Figures 9, 10:
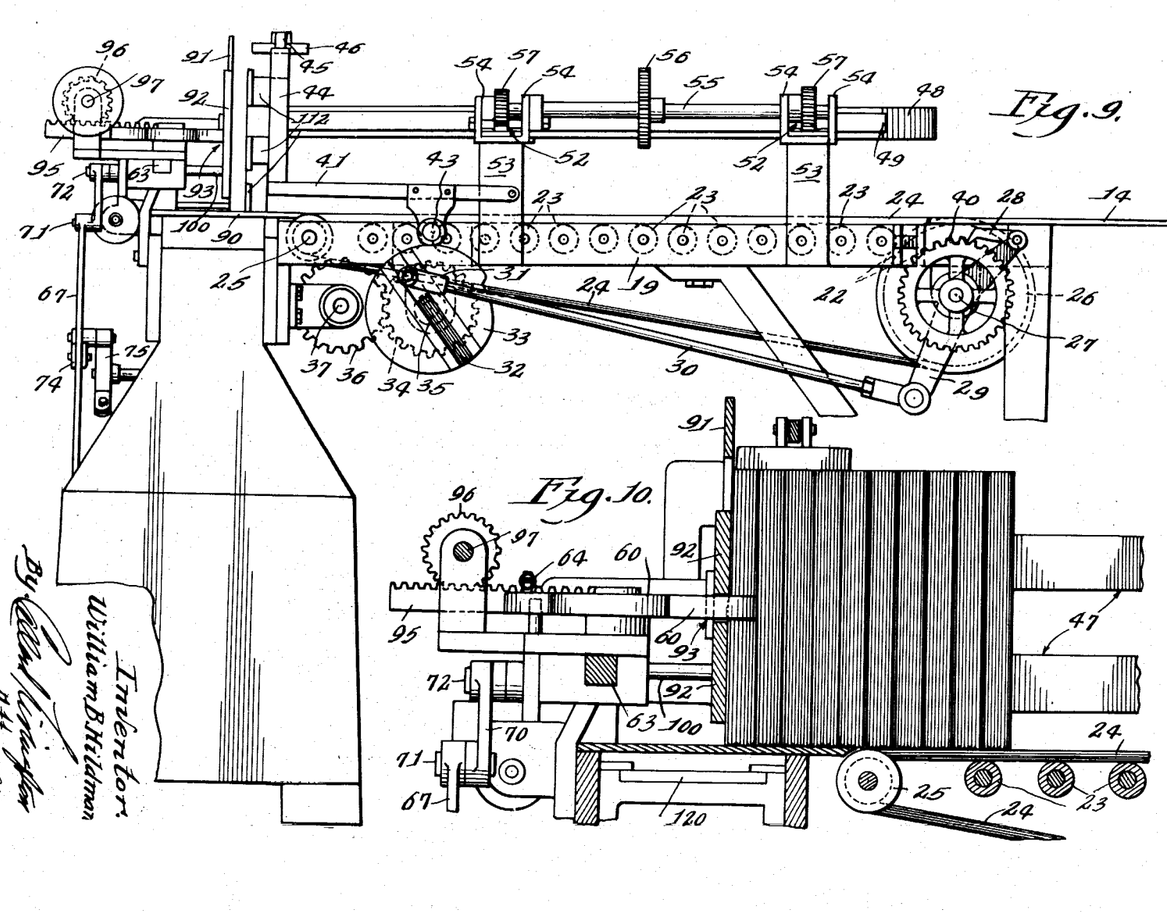
Fig. 9 is an elevational view, to enlarged scale, of the infeed bed and drive.
Fig. 10 is an enlarged vertical-sectional detail through the infeed bed at the advancing pawl.

Jogging occurs at the infeed station as a result of a relaxation or slight back-up feature of belts 24; it occurs again to some extent as pawl 60 engages the trailing book edges; and again by action of a rising and falling patter 46 (Figs. 5 and 9) vibrated by a cam drive 33—43, Fig. 9. Further jogging occurs by the drop-off action illustrated by book BB, Fig. 4, with an important jogging action resulting from reciprocatory jumping and backing-up of the books by action of jog plate 120 and bars 100.

Referring to the top plan view of Fig. 2, there is provided an elongated jogging and conveying bed generally indicated at 12, from which projects at right angles an infeed bed generally indicated at 13 and having a feeding table 14 on which a stack of books (incompletely bound) of gathered signatures or sheets is placed.

Figure 1:
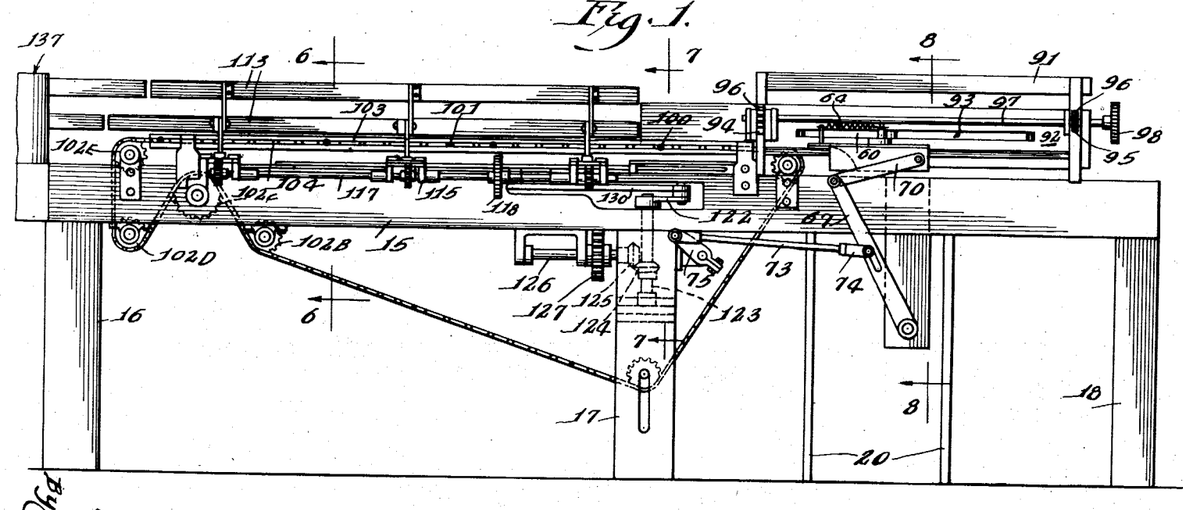
Fig. 1 is a side elevation of the jog-feeder.

As in Fig. 1, the machine includes a main chassis of horizontal frames 15 supported on vertical frames 16, 17, and 18; the infeed section similarly includes horizontal frames 19 and legs 20, Fig. 9, with cross tie bars 22 and a plurality of rollers 23 journalled crosswise of the bed in said frames 19 to provide sag support for a plurality of transversely spaced continuous belts 24 (Fig. 5 also) which constitute a combination infeed conveying and initial jogging means.

At one end these belts 24 train around small idler pulleys 25, while their opposite ends train over larger drive pulleys 26 lying partly beneath the feeding table and all fast on infeed shaft 27. Feed belts 24 are of rubber or analogous flexible and frictional characteristics, and they are driven unidirectionally (right to left, Fig. 9) by a pawl 28 on crank 29 which floats on shaft 27 and which is oscillated by rod 30 the end 31 of which slides in track 32 of a cam 33. The feed pawl 28 works in the teeth of gear 40 fast on shaft 27, while cam 33 (Figs. 5 and 9) is fast with gear 34 on stud shaft 35, and gear 34 is driven by gear 36 on the main drive shaft 37. It is important to observe that pulley belts 24 are tensioned and adjusted so as not to be fully taut by reason of which they have a tendency upon the driving (anticlockwise) motion of pulleys 26 to rise up against the bottom edges of the infeeding books and frictionally engage the same and carry them to the advancing means, while on the idling back stroke (clockwise) of pawl and crank 28, 29, there is a relaxation of said belts which in effect gives them a slight backward motion having two important effects, first, to withdraw pressure from the lead book, and second to jostle or jog the sheets and signatures slightly to effect a sort of preliminary jogging.

Top-edge leveling means, Fig. 9, includes an arm 41 pivoted at 42 and provided with a cam roller 43 riding on the periphery of cam 33, which effects an oscillation of said arm 41, to which is rigidly attached an upright arm 44 having an overhead projection 45 (Fig. 5) with a pivoted patter block 46 at the end thereof, which is vibrated up and down against the uppermost edges of the leaves of the books as the same move into advancing position at the end of the infeed bed, it being understood here that top and uppermost edges mean the edges opposite the binding edges of the signatures or sections, the latter resting on the conveyor belts 24.

Figure 5:
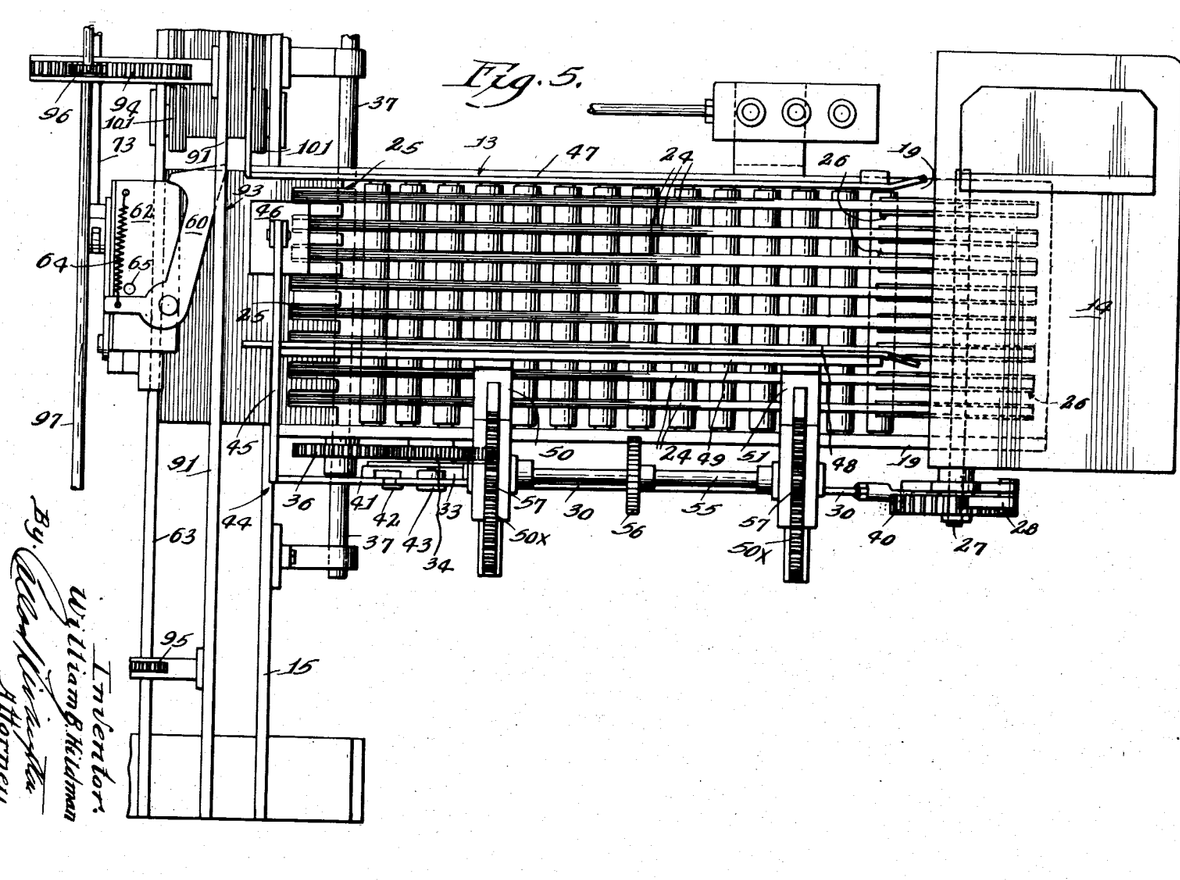
Fig. 5 is a top plan view, to enlarged scale, of the infeed section of the machine.
Figure 8:
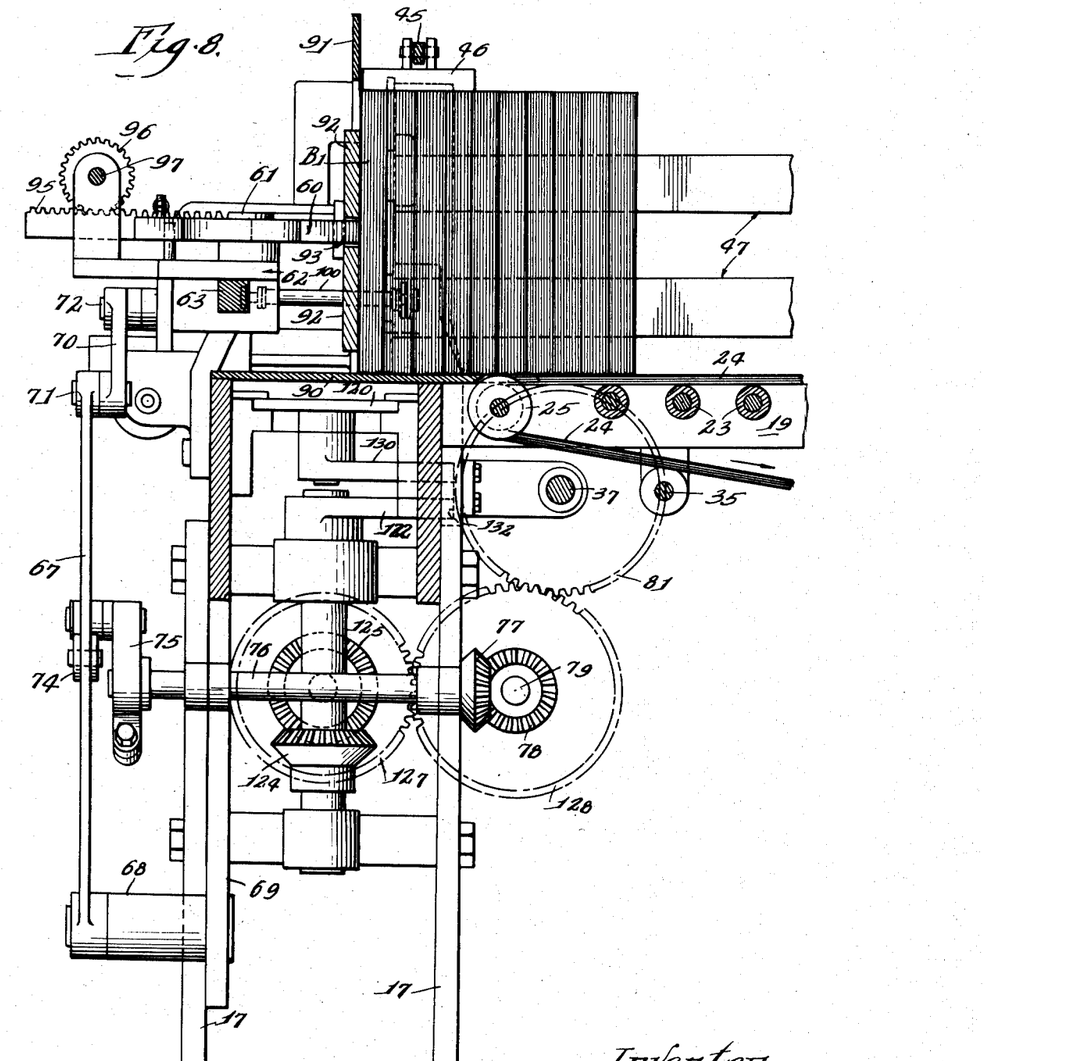
Fig. 8 is another vertical sectional detail along lines 8—8 of Fig. 1, showing details of the jog drive.

As viewed particularly in Fig. 5, the infeed bed is provided with parallel guide rails 47 and 48 between which the infeeding books move on belts 24, there being two of the rails 47 as in Figs. 8 and 10, both of which are fixed, whereas the rail 48 is adjustable, being attached to a bar 49 secured to a pair of rack blocks 50 and 51 slidable in tracks 52 on uprights 53 mounted on the bed rails. As part of each rack block, is a trunnion 54 in which is journalled an infeed rail adjusting shaft 55 (Figs. 5 and 9) provided with a knurled adjusting wheel 56, manipulation of which results in turning of said shaft and pinions 57 fast thereon, which in turn mesh in teeth 50X, Fig. 5, of the rack blocks; thus, turning of adjusting wheel 56 in opposite directions shifts the guide rail 48 transversely of the infeed bed to receive different size books for different runs.

Advancing means for seizing books one at a time from the infeeding stack and moving the same into the jogging bed, includes, Fig. 3, an advancing pawl 60 pivoted at 61 on a carrier block assembly 62 slidable back and forth on a square rail 63 (see also Fig. 8); pawl 60 is rendered yieldable by spring 64 holding the same against stop pin 65.

Figure 4:
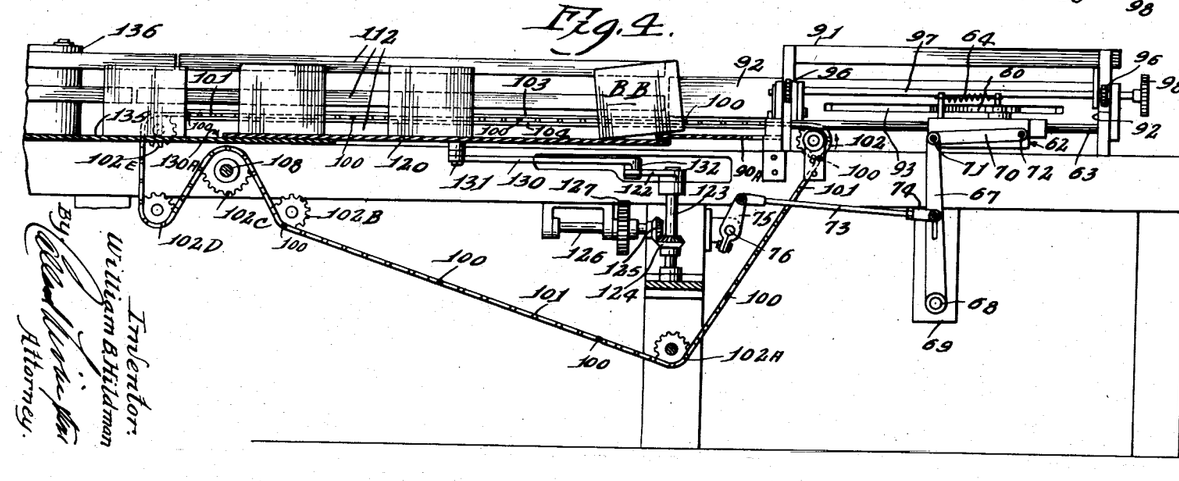
Fig. 4 is a median vertical section through the jogging bed with the infeed shown in elevation.

As viewed in Fig. 4, carrier block 62 is reciprocated by rocker lever 67 pivoted at 68 on a pendant member 69 of the frame, the upper end of said lever being pivotally connected to said block by a link 70 with pivotal connections at 71 and 72, the lever being oscillated by a pitman 73 having an adjustable connection 74 therewith and connecting at its opposite end to a rotating crank 75 fast on stud shaft 76. The foregoing driving connections are shown to larger scale in Fig. 8, which also shows the power drive for said stud shaft 76, the latter being journalled in the spaced upright frames 17 and having a bevel gear 77 meshing with a companion gear 78 on stud shaft 79, which in turn has a gear 80 meshing with gear 81 on the main power shaft 37, so that the back and forth movements of the advancing pawl 60 are timed in a predetermined relationship of synchronization with the operation of other parts of the machine driven from said main power shaft.

The lead book B₁ of the infeeding stack rides onto a plate 90 against a pair of adjustable stop rails 91, 92, the latter being relatively wide and provided with a horizontal slot 93 (Figs. 1 and 8) into which the nose of the advancing pawl projects in such manner that, when the pawl is retracted to starting position, as in Fig. 3, it will lodge behind the trailing edge (in direction of advance) of the leading book B₁, as in Fig. 3 and the enlarged view of Fig. 10, so that when the pawl advances, the leading book will be pushed from the position of Fig. 3, toward the left and into the jogging bed.

The aforesaid stop rail structure 91—92 is adjustable, and is mounted on rack bars 94, 95, Fig. 3, and pinions 96 on adjust-shaft 97, meshing with the teeth of the racks, will shift said rail structure 91—92 inwardly and outwardly against the advance of the infeeding books, responsive to manipulation of adjusting wheel 98, so that the position of the leading book B₁ may be properly registered with the nose of the advancing pawl, enabling the latter to pick off only one book at a time, and that one completely and with full contact with the face of the pawl, no more, no less.

The leading book will be advanced by the pusher or pawl 60 on bed plate 90 to a point (Fig. 4) just beyond (toward the left) the rise of conveyor rods 100 on sprocket chain 101 as the latter trains upwardly and over sprocket gear 102, the bed plate 90 being divided at this point but having a continuing apron 90A on which the book continues to ride after being picked up and pushed along by the oncoming rod 100.

As will appear in Fig. 3, there are a pair of said chains 101 and corresponding sprockets 102, 102A, 102B, 102C, 102D, 102E, training the chains in a continuous path over the length of the jogging bed and thereunder with drive means therefor to be described.

Figure 6:
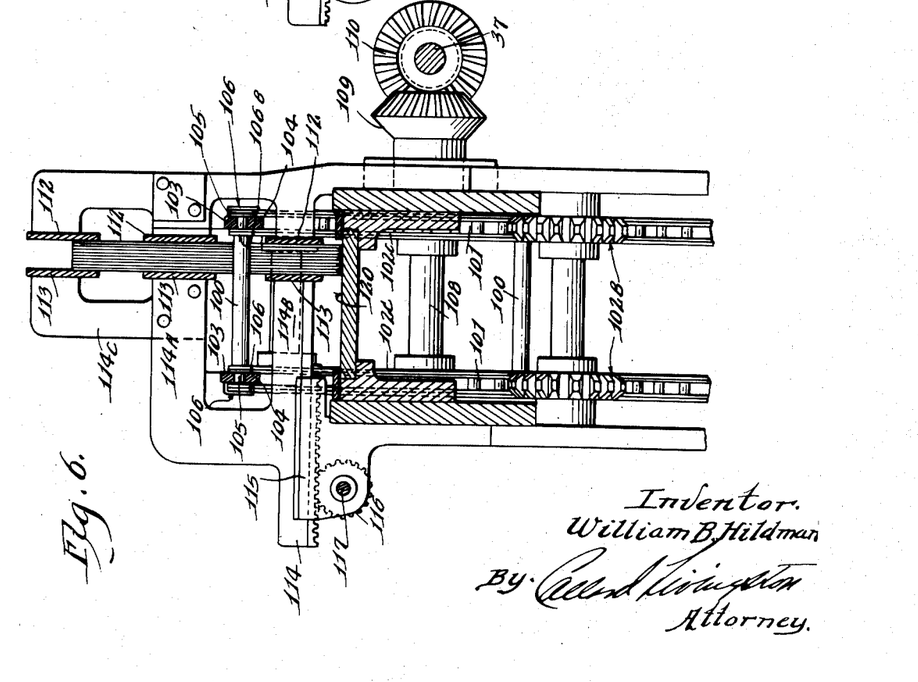
Fig. 6 is a vertical sectional detail looking in the direction of lines 6—6 of Fig. 1 showing the conveying means and jog bed.

Each of said conveyor chains 101 is a conventional sprocket chain especially mounted for stability between corresponding pairs of chain guide rails 103, 104 in the manner shown to greater advantage in the sectional view of Fig. 6, wherein it will be observed that the linking pins 105 of the chain links fit in the space (extending horizontally) between each pair of said rails, while the flanking chain link pieces, being of wider dimension than the diameter of said pins, fit on the outsides of the rails, as at 106, the corresponding conveyor rod 100 also appearing in this view. Thus, in effect, the chain guide rails extend horizontally and have horizontally extensive slots in which the pin portions of each chain link move and in which said pins are confined by the flanking link pieces owing to the fact that the latter are larger than the width of the slots.

Conveyor chains 101 are driven continuously by the means shown in Figs. 3, 4 and 6, the latter particularly, wherein it appears that sprockets 102C, fast on a stud shaft 108 beneath the jogging bed, are rotated by bevel gear 109 meshing with companion gear 110 on the main drive shaft 37 (Fig. 3).

The books travel in vertical planes, serially, as in Fig. 4, and they are guidably supported in this motion by a trio of fixed guide rails 112 on one side of the line of travel (see also Fig. 6), and an adjustable trio of similar rails 113 on the opposite side of the line of travel in accordance with the construction appearing in Fig. 3, which utilizes three rack brackets 114, seated slidably in corresponding track blocks 115 for movement back and forth transversely of the movement of the books and the jogging bed.

An enlarged view of the rack and adjustment structure is seen in Fig. 6, there being a pinion 116 meshing with the rack teeth for each block, said pinions all being fast on an adjusting shaft 117 rotatable by hand adjusting wheel 118 (the latter in Figs. 2 or 3); as in Fig. 6, the rack bracket 114 is of U-shape, in part, with arms 114A and 114B supporting the two lowermost guide rails 113, while an extension arm 114C on said bracket supports the topmost rails 113 of the trio. Thus, by turning hand wheel 118, Fig. 3, the width of the conveying alley or guide track may be widened or narrowed in accordance with the thickness of the books being run.

Figure 7:
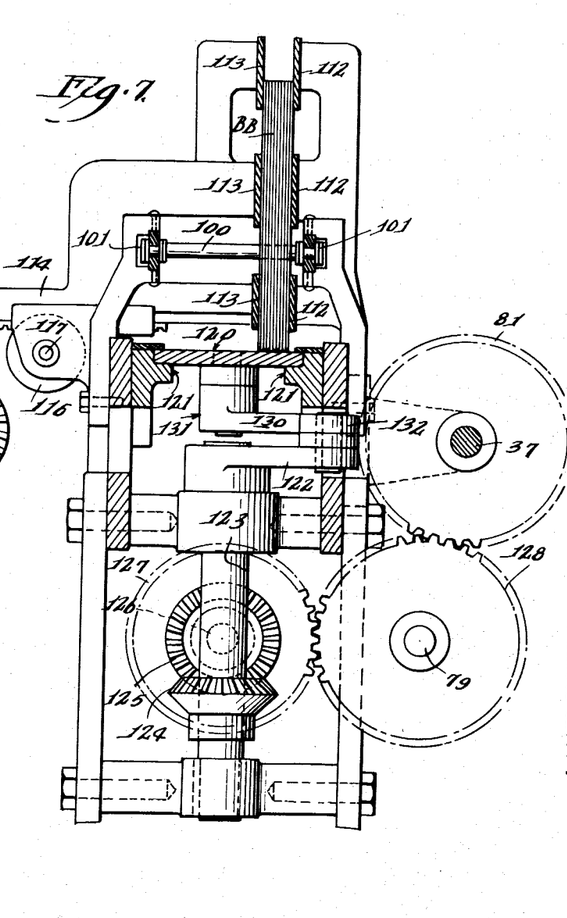
Fig. 7 is another vertical sectional detail through the jog bed and drive therefor, looking in the direction of lines 7—7 of Fig. 1.

In Fig. 7, the book BB will be seen to rest on a jogging bed or table plate 120, which is slidably seated in flanged bed rails 121 for reciprocatory motion under the driving urgence of a crank 122 on a vertical stud shaft 123 provided with bevel gear 124 meshing with gear 125 on stud shaft 126 (Fig. 4 also) trunnioned beneath the bed and having a spur gear 127 meshing with a driving spur 128 (Figs. 3 and 7) on the stud countershaft 79 which drives the advancing pawl previously described, said countershaft being driven through gears 80 and 81 from the main drive shaft.

The bed 120 is reciprocated (see vertical section, Fig. 4 or 7) by a link 130 pivotally connecting with the underside thereof as at 131, and to crank 125, as at 132.

In Fig. 4 it will be noted that the jogging bed 120 is at a level below that of the apron 90A, such that the book BB drops in the manner illustrated to effect a further jogging against the reciprocating jog plate.

The rate of reciprocation of the jog plate or bed, relative to the rate of travel of the conveyor chain cross bars 100, is such that the books will advance, in the direction of general travel, away from and ahead of the conveyor bar 100 therebehind, but on the return stroke of the jog bed, the book will be retracted smartly against said conveyor bar, and this escape and return jogging action will occur several times before each book reaches the end of the jogging bed, at 136A, Fig. 4, to lodge upon the discharge bed 135, where it will be seized by friction belts 136 forming part of the infeed means of an associated machine having a main power or drive shaft 137.

The novel jogging machine is preferably, but not necessarily, intended to be coupled with an associated machine, such as a known type of gluer, with which the jogging machine is preferably synchronized by taking its driving power from the main drive shaft of the associated machine or gluer through coupling 138, Fig. 3. In this way, the gathered signatures or sheets in the books, having been squared or aligned by the jogging process are passed directly to the gluing machine, which applies a semi-flexible glue to the backbone or binding edges of the books to hold same in trim and aligned condition until the books can be fed later into another machine, such as a rounding and backing machine.

*Summary of operation*

Considering the top plan view of Fig. 2, a stack of book signatures, usually loosely sewn in book form so that the stacks include a plurality of incomplete or unfinished books, is placed, binding edges down on infeed table 14 and manually advanced onto the relaxation feed belts 24, which are intermittently advanced in a direction toward the bottom of the sheet, Fig. 2, or toward the left, Fig. 9, guide rails 47, 48, having been previously adjusted by hand wheel 56, if necessary, to accommodate the size of book being run.

The relaxation feed belts 24 are intermittently advanced toward the left by unidirectional-drive or pawl and ratchet means 28, 29, 30, 33, Fig. 9, taking power from the main drive shaft 37; and the belts are chosen to have some stiffness and a length, relative to their span and the diameters of the pulleys 25, 26 over which they are trained, so as to have a slight backward relaxation movement in the neighborhood of one-quarter inch of travel when the feeding advance thereof stops. This relaxation movement tends to pull the advanced books backward slightly, jostling them slightly and also relieving pressure from the leading book in the infeeding stack.

The leading book, as indicated at B₁, Fig. 3, registers or stops against a rail structure including rail 91, and this occurs at a time when the feeding or advancing pawl 60 is fully retracted. When the pawl 60 advances, through driving linkage 67, 73, 75, 76, 77, 78, 79, with the main drive shaft, it pushes said leading book into the position just to the left of conveyor chain sprocket 102, Fig. 4, so that as the next conveyor bar 100 rises with chain 101, it engages said book and pushes the same onto the apron 90A, and thence over the drop-off or jog-drop onto the jogging bed or plate 120.

The jogging bed plate 120 is reciprocated rapidly by a crank and link means 122, 130 (Figs. 4 and 7) taking power from countershaft 79 by bevel gears 124, 125 and spur gears 127, 128, 129; as a result of such reciprocation, the book BB, for example, Fig. 4, will escape or jump ahead of (to the left) its conveying bar 100, but during the intervals of reversal of said jogging bed, book BB will back up against the steadily oncoming conveyor bar 100 and thereby be appreciably jogged, and this action will be repeated several times before the book reaches the end of its travel through the jogging machine, until the books are trimmed-up or squared up suitably for further binding operations, by which is meant that the pages of the books and signatures are flush at the edges and corners.

In the embodiment shown for illustration, the machine is adapted to feed the jogged books into an associated gluing machine having, Fig. 3, infeed conveyor belts 136 to seize the books from the jogging machine as they are lodged by conveyor bars 100 at the end of their travel on the discharge apron 135, the gluing machine applying a semi-flexible glue to the backbones of the books so that they will not get out of trim for subsequent operations in binding. Accordingly, it is desired that the jogging and feeding machine of this invention be synchronized with the associated machine, which, of course, could be any other machine having an infeed to receive the jogged books, and a main drive shaft 137 utilizable for synchronizing purposes and from which the synchronizing and driving power for the jogging machine may be coupled, as at 138, to its main drive shaft 37.

In the jogging machine, the width of the conveying and jogging alley is adjustable by manipulation of hand wheel 118 to move rails 113 transversely inward or outward of the companion rails 112. Similarly, the registering and stop rails 91, 92, Figs. 4 and 8, are adjustable by manipulation of hand wheel 98. The stroke of the advancing pawl is mainly adjustable at connection 74 for books of different height.

I claim:

1. A jogfeeder comprising a bed plate mounted for movement in a substantially horizontal plane, conveyor means movable in a direction across said bed plate, engaging means part of said conveyor means and spaced apart in the direction of movement thereof, mechanism for moving said bed plate in a back-and-forth motion in timed relation to movement of said conveyor means and the engaging means thereof, but at a rate differing therefrom, whereby articles transported by said engaging means onto and across said bed plate are jumped ahead of and back against said engaging means to jog said articles.

2. A jogfeeder including a jog plate mounted for back-and-forth motion, spaced conveyor chains moving in parallelism circuitously over and under said plate in the direction of motion thereof, pusher members spaced apart in the direction of travel of said chains and supported therebetween, drive means moving said chains continuously while moving said jog plate back and forth at a predetermined jogging rate, whereby articles are transported over said jog plate while resting thereon by said pushers and said articles are jumped away from and back against a pusher repeatedly during transport as aforesaid to jog the articles.

3. Apparatus as set forth in claim 2 and further including a delivery apron at a level different from that of said jog plate and positioned in advance of the latter in the direction of transport of articles by said conveyor pushers, whereby articles are further jogged in transport from the level of said apron to that of said jog plate.

4. A jogfeeder comprising a conveyor having serially moving pushers, said pushers adapted to move articles in seriatum along a path and being spaced apart in the direction of travel a distance greater than the corresponding length of an article to be pushed thereby, means actuating said conveyor to move said pushers at a predetermined rate, a movable jog bed forming part of said path and upon which said articles rest in transit, and means moving said bed in timed relation to said predetermined rate and in directions to disengage an article from a corresponding pusher in the direction of travel aforesaid and return the disengaged article against said corresponding pusher with substantial force to jog the article.

5. A jogfeeder in accordance with claim 4 and further characterized by the provision therein of a drop-off apron in said path ahead of said jog bed in the direction of travel of articles and traversed by conveyed articles in movement onto the bed, whereby to cause said articles to be jogged onto said bed.

6. A jogfeeder including serially moving article pushers spaced apart in direction of travel a distance greater than the length of an article intended to be transported thereby, a movable jogging bed forming part, at least, of a support for said articles during transport, means for moving said bed in a direction ahead of said pushers at a rate faster than the travel of the pusher to disengage a pushed article therefrom, and means for reversing motion of said bed to reengage said disengaged article with substantial impact against the pusher from which it was disengaged for the purpose of jogging the article.

7. A jogfeeder including serially advancing pushers for moving gathered book signatures along a predetermined path, a jogging bed supporting said signatures during part of their travel, at least, along said path, means mounting said bed for reciprocatory motion in the direction of said travel, means moving said pushers at a determined rate for transport of signatures as aforesaid, means reciprocating said bed at a rate to disengage a signature book from a corresponding pusher and advance the same in the direction of travel ahead of its pusher a predetermined distance and then reverse said bed motion to reengage the disengaged book with its corresponding pusher whereby to jostle the leaves and signatures of said book to trim up the sheet edges in alignment.

8. In a book jogging machine, an elongated guiding alley, crosswise conveyor bars travelled along said alley, and a jog bed reciprocated in the direction of travel of the books in said alley at a point between the ends thereof, and at a rate correlated to the rate of travel of said bars to jump one or more books ahead of a bar pushing the same, and back against the bar.

9. In a book signature jogging apparatus, a guide bed in which the signatures are conveyed seriatim, a pair of endless chains, travelling in step along said guide bed, one on each side of the latter, conveyor members carried by said chains crosswise of the guide bed for pushing said signatures along the guide bed, a jog member situated at a point between the ends of said guide bed and reciprocable lengthwise of the latter, drive mechanism for travelling said chains and reciprocating said jog member at a differential rate such that a signature on the jog bed will be moved ahead of a corresponding conveyor member in one direction of movement of the jog member, and then carried backward positively against said corresponding conveyor member in an opposite return movement of said jog member to jostle the sheets of the signature.

10. In a sheet jogging mechanism, means defining an alley to guide gatherings of sheets in a succession along the length thereof, unidirectionally travelling pushers extending crosswise of said alley at a level above a floor therein and moving in a direction from one end of the alley toward the other end thereof so as to engage a trailing edge of a said gathering of sheets and push the same along the alley, and jogging means reciprocable in the direction of travel of the gatherings substantially in the plane of the level of said floor to move a said gathering back and forth along the line of travel thereof, and drive means for moving said jogging means at a rate relative to the rate of advance of said pushers thereover so as to carry a sheet gathering pushed thereby forwardly, out of contact with said pusher, and return said gathering in a direction against the travel of said pusher for reengaging impact therewith to jostle the sheets.

11. In a jogging machine for book signatures and the like, the combination, with pushers travelling unidirectionally to move said signatures seriatim in spaced relation along a guideway, of a jogger onto and over which said signatures are moved by said pushers, and means for reciprocating said jogger in the direction of travel of said pushers and at a rate faster than the relative travel of said pushers thereover so as to move a signature on the jogger first ahead and then back toward the pusher moving said signature for impact therewith a plurality of times before leaving said jogger.

12. In a jogging machine, in combination, means defining a longitudinal guide alley, longitudinally spaced, laterally extensive pushers and means travelling the same at substantially uniform speed along said alley to push books of sheets therealong, a longitudinally reciprocable floor portion in said alley onto and past which said books are moved by said pushers, and means reciprocating said floor portion at a speed differentiated from the speed of said pushers to lead each book ahead of the pusher moving it and thereafter effect an impact between said book and pusher at least once during travel of the books in said alley, to jostle the sheets.

13. In a jogging machine, means for guiding books serially along a path, a jogger at a station between the ends of said path, means for pushing books from one end of said guide means toward the other end thereof onto and past said jogger, and means for moving the jogger ahead of a pushing means travelling thereover and then oppositely to cause a book to escape ahead of its pushing means and then be backed into collision therewith to impart a jogging blow to the book.

14. In a jogging machine for bookbinding including a conveyor with successively spaced, unidirectionally travelling means for engaging book signatures at a trailing edge thereof and pushing them seriatim along a path, and a movable jogging bed forming part of said path, the improvements which comprise, to wit: moving said travelling means at a predetermined and approximately steady speed, and a jogging bed disposed for limited, reverse displacements in the line of movement of said signatures and travelling means, and means for reversely displacing said bed at a speed such that when moving in the direction of motion of said travelling means, a signature on said bed will be carried momentarily ahead of the travelling means which is pushing said signature, and when said bed is reversely displaced, said signature will be returned to forcibly meet said travelling means and jostle the signature sheets.

15. In a jogfeeder, in combination, a reciprocable jog table, a narrow channel extending over said table in the direction of reciprocation thereof to guide book signatures in upright position, serially in edgewise travel onto and beyond said table, signature travelling members moving in said channel toward and past said table, and spaced apart to permit back and forth movement of a signature in the space between successive ones of said travelling members, and means reciprocating said table and moving said travelling members at different relative rates to lead a signature on said table ahead of a corresponding travelling member and then reverse the motion of the signature so that it will be struck a jogging blow by said corresponding travelling member.

16. In a jogging machine means for pushing books of sheets in a series in a vertical plane along a path, means for moving each book at least once during travel along said path ahead of its pushing means and reversely back into collision therewith to jostle the sheets into an alignment.

17. A jogfeeder including a jog bed, an infeed for feeding book assemblies in succession, advancing means for removing books one at a time from the infeeding succession and transporting the removed book to a predetermined position, conveyor means extending laterally of the books relative to their travel for advancing a book from said position over the jog bed, means for moving said jog bed back and forth in jogging coaction with said conveyor means but at a faster rate than the latter to jump the books away from, and back against, said lateral means, and a discharge bed onto which books are conveyed by said conveyor means from said jog bed.

18. A jogfeeder comprising a jogging bed, a conveyor including a succession of lateral pushers moving books serially onto and over said bed from a seizing station, actuating mechanism imparting reciprocatory jog action to said bed in timed relation codirectionally with, but at a different rate from, the conveying operation of said conveyor, mechanism for delivering books in succession to said seizing station, and power drive means for the aforesaid mechanisms.

19. A jogfeeder for books of loosely gathered sheet elements, said jogfeeder comprising a reciprocable jogging bed, a conveyor and guide means for moving said books serially in an upright position resting on their binding edges onto and over said bed from a receiving station, said conveyor including serially spaced book engagers positioned to engage the trailing margins of the book sheets, actuating mechanism imparting vibratory jog action to said bed and continuously advancing said conveyor and engagers across said bed in the direction of vibration thereof and in differentially timed relation thereto, whereby books conveyed on said bed are intermittently jumped ahead of and back against said engagers in jogging action, and means for delivering books serially in said upright condition to said receiving station.

20. A jogfeeder including means for guiding book signatures along a predetermined path, serially spaced-apart advancing-pushers positioned to engage the trailing edge parts of said book signatures to move the same along said path; movable jogging means supporting said signatures during at least part of their travel along said path, said jogging means being mounted for reverse motions relative to the direction of signature travel along said path; means moving said pushers at a predetermined rate for advancing the signatures as aforesaid; means for reversely moving said jogging means at a rate to carry a pushed signature ahead, in the direction of travel, of the corresponding pusher moving the same along said path, and for thereafter returning said signature with impact against said corresponding pusher for the purpose of jostling the sheets thereof into trim; and means for feeding signatures serially into position for pushing engagement by said pushers.

21. In a jogging machine, serially spaced and jointly traveling pusher members respectively engageable with one edgewise margin of a gathering of sheets to advance the gatherings along a path; and means engageable with another edgewise margin of the advanced gatherings, and movable both in the direction of said advance and oppositely thereto, for advancing each book ahead of a said pusher member, and reversely back into collision therewith to jostle the sheets of the gathering, together with drive means for traveling said pusher members and reversely actuating said jogging means in timed relation in the member and for the purpose aforesaid.

22. In a jogging mechanism, means for guiding books of gathered sheets sequentially along a jogging path; advancing means engageable with one edgewise side of each book to advance the same unidirectionally along said path; jogging means engageable with another edgewise side of each book to move the latter toward or away from said advancing means along a line in the direction of advance of the books; and drive means for actuating said advancing and jogging means in a predetermined timed relation such that the jogging means moves each book in both advancing and retrograde directions and moves each book in the advancing direction away from advancing engagement by said advancing means, and returns such book in the retrograde direction back into collision with said advancing means.

23. A jogfeeder adapted to prepare book signatures for transfer into a companion machine, said jogfeeder including an alley and pushers extending crosswise of the alley and moved in succession to push said signatures against trailing margins of the signatures from an infeed to an outfeed end of the alley, a jog bed reciprocated in a lengthwise sense of the alley along at least a part of the length of the latter and at a point between said ends thereof and onto and over which bed signatures are pushed, and infeed means to carry signatures in succession to an infeed station in said alley, said signatures being oriented in the position in which they may be advanced seriatim from said station into said alley and into position for advancing engagement by said pushers, and drive mechanism common to said pushers, said jog bed and said infeed means for traveling said pushers at a predetermined rate, reciprocating said jog bed at a relatively faster rate of travel than said pushers, and to intermittently start and stop said infeed means at a predetermined rate, and an infeed pawl driven by said common drive in predetermined timed relation to movements of infeed means and pushers to advance a signature from said infeed station into a position in said alley for engagement by one of said pushers.

WILLIAM B. HILDMANN.

References Cited in the file of this patent

UNITED STATES PATENTS

| Number | Name | Date |
|---|---|---|
| 845,369 | Murray | Feb. 26, 1907 |
| 1,125,310 | Gullberg | Jan. 19, 1915 |
| 1,614,715 | Christensen | Jan. 18, 1927 |
| 1,686,122 | Brennan | Oct. 2, 1928 |
| 1,729,237 | Albertoli | Sept. 24, 1929 |
| 2,163,812 | Schramm | June 27, 1939 |
| 2,313,814 | Eisler | Mar. 16, 1943 |